US006429863B1

(12) United States Patent
LoPiccolo et al.

(10) Patent No.: US 6,429,863 B1
(45) Date of Patent: Aug. 6, 2002

(54) METHOD AND APPARATUS FOR DISPLAYING MUSICAL DATA IN A THREE DIMENSIONAL ENVIRONMENT

(75) Inventors: Greg LoPiccolo; Jonathon Bell, both of Brookline; Eran Egozy, Cambridge, all of MA (US); Ryan Lesser, Providence, RI (US); Joshua Randall, Brookline, MA (US); Alexander Rigopulos, Arlington, MA (US); Dan Schmidt, Cambridge, MA (US)

(73) Assignee: Harmonix Music Systems, Inc., Cambridge, MA (US)

( * ) Notice: Subject to any disclaimer, the term of this patent is extended or adjusted under 35 U.S.C. 154(b) by 0 days.

(21) Appl. No.: 09/510,590

(22) Filed: Feb. 22, 2000

(51) Int. Cl.$^7$ ................................................. G06T 15/00
(52) U.S. Cl. ..................................................... 345/419
(58) Field of Search ................................ 345/419, 619, 345/440, 440.1, 440.2, 764; 84/609, 477 R, 478; 434/433

(56) References Cited

U.S. PATENT DOCUMENTS

| | | | |
|---|---|---|---|
| 5,148,154 A | | 9/1992 | MacKay et al. ............ 340/712 |
| 5,496,179 A | * | 3/1996 | Hoffman ..................... 434/433 |
| 5,616,876 A | | 4/1997 | Cluts ............................ 84/609 |
| 5,728,960 A | * | 3/1998 | Sitrick .......................... 84/477 |
| 5,792,971 A | * | 8/1998 | Timis et al. .................. 84/609 |
| 5,812,688 A | | 9/1998 | Gibson ....................... 381/119 |
| 5,864,078 A | | 1/1999 | Koevering ................... 84/478 |
| 5,900,564 A | | 5/1999 | Kurakake ..................... 84/477 |
| 5,908,997 A | | 6/1999 | Arnold et al. ................ 84/615 |
| 5,952,599 A | | 9/1999 | Dolby et al. ................. 84/649 |
| 6,307,573 B1 | * | 10/2001 | Barros ........................ 345/764 |

FOREIGN PATENT DOCUMENTS

| | | |
|---|---|---|
| DE | 197 16 937 A1 | 3/1998 |
| EP | 0 945 849 A1 | 9/1999 |
| WO | 99/13455 | 3/1999 |

OTHER PUBLICATIONS

Christian Nutt, "Beat Planet Music," retrieved from http://gamesport.com/gamespot/stories/reviews/0,10867, 2546762,00.html, posted Mar. 24, 2000, pp. 1–3.

Playstation Screens, "Beat Planet Music," retrieved from http://gamespot.com/gamespot/filters/products/screenindex/0,11104,196744–2,00.html, retreived on Aug. 27, 2001, pp. 1–2.

* cited by examiner

*Primary Examiner*—Almis R. Jankus
(74) *Attorney, Agent, or Firm*—Testa, Hurwitz & Thibeault, LLP

(57) ABSTRACT

A method for displaying musical data in three dimensions includes displaying musical data along a spatial path that does not lie within the image plane of a display. Graphical symbols corresponding to the musical data may be displayed on graphical surfaces aligned with the spatial path. The graphical surfaces form, in some embodiments, a tunnel through which the time axis associated with the musical data runs. The musical data may be manipulated to provide the viewer with the appearance of motion along the time axis associated with the musical data. In some embodiments, the viewer is represented by a virtual camera in the three-dimensional environment and the virtual camera is "moved" to provide the appearance of motion. A corresponding apparatus is also discussed.

22 Claims, 7 Drawing Sheets

METHOD AND APPARATUS FOR DISPLAYING MUSICAL DATA IN A THREE DIMENSIONAL ENVIRONMENT

FIELD OF THE INVENTION

The present invention relates to display techniques and, in particular, to techniques for displaying musical information in a three-dimensional environment.

BACKGROUND OF THE INVENTION

Music is often defined as "sound organized in time." Generally speaking, a musical composition is essentially a specified set of musical data parameters and their variation over time. Music notation provides a way for a composer to represent these time-varying musical data visually, such that a musician can interpret the data as instructions and perform the composition as audible music.

Several systems exist for visually displaying musical data. One such system is known as "common practice notation" or "CPN." FIG. 1A depicts an example of music displayed using common practice notation. The musical time axis is represented as a spatial path that proceeds from left to right along the page. The musical data are represented as graphical note symbols plotted on a staff along this path. These note symbols indicate the individual timing, duration, and pitch for each of a series of musical tones. A note's timing and duration is indicated by its horizontal position along the staff, as well as by its type of note head and stem. A note's pitch is indicated by its vertical position on the staff. CPN also includes many additional symbols (not shown in FIG. 1A) for indicating various other musical properties such as volume, articulation, etc.

Another notation system is known as "piano roll notation" or "PRN." FIG. 1B depicts an example of music displayed in piano roll notation. The musical time axis is represented as a spatial path that proceeds from top to bottom along the page. Musical data are represented as graphical note symbols plotted along this path. The note symbols (generally vertical bars) indicate the timing, duration, and pitch for each of a series of musical tones. Timing is indicated by the vertical position of the bottom edge of a note. The vertical length of a note indicates duration. Pitch is indicated by the horizontal position of a note. Piano roll notation may also be depicted in horizontal, rather than vertical, format.

Many other systems for visually displaying musical data exist. One property common to all such systems is that they are inherently two-dimensional, i.e., the spatial path representing the musical time axis lies exclusively within the substantially two-dimensional plane of the display surface (referred to throughout as the "image plane"). While these two-dimensional systems for displaying musical data are adequate for conventional applications such as instructing musicians, two-dimensional systems are not ideal for displaying musical data in the context of an interactive gaming environment, because in the state of the art for interactive gaming three-dimensional graphical environments have become the norm.

SUMMARY OF THE INVENTION

The present invention provides a method and apparatus for displaying musical data in a three-dimensional environment in which the spatial path corresponding to the musical time axis does not lie within the two-dimensional image plane onto which the three-dimensional environment is rendered. In one embodiment the perception of the viewer is that of traveling along a path in the three-dimensional environment. The path may be straight or curved and, in some embodiments, the path comprises multiple curved segments. This method of displaying musical data provides a viewer with the appearance of navigating through a three-dimensional space, which is a common paradigm for interactive entertainment software such as game software. Thus, the present invention provides a way to represent musical data in a way that is suitable for entertainment purposes.

In one aspect the present invention relates to a method for displaying musical data on the image plane of a provided display. Musical data is displayed in a three-dimensional graphical environment such that a spatial path corresponding to the musical time axis associated with the musical data does not lie within the substantially two-dimensional image plane of the provided display. In some embodiments that spatial path is linear, curved, continuous, or discontinuous. Musical data may be displayed on graphical surfaces aligned with the spatial path. The graphical surfaces form, in some embodiments, a tunnel through which the time axis associated with the musical data runs. In other embodiments the graphical surfaces form a road along which the time axis associated with the musical data runs. The graphic symbols representing the musical data may be manipulated to provide the viewer with the appearance of motion along the time axis associated with the musical data. Alternatively, the virtual "camera" associated with the thee-dimensional environment may be moved along the time axis associated with the musical data to provide the user with the appearance of motion.

In another aspect, the present invention relates to an apparatus for displaying musical data that includes a display having an image plane and a graphics engine that displays musical data on the display such that a spatial path corresponding to a musical time axis associated with the musical data does not lie in the image plane of the display. In some embodiments, a memory element stores the musical data for display. The graphics engine can display musical data along a spatial path that is linear, non-linear, continuous, or discontinuous. In other embodiments the graphics engine manipulates the graphical symbols associated with the musical data to provide a viewer with the appearance of motion along the time axis associated with the musical data. Alternatively, the graphics engine may change the position of a camera to provide the appearance of motion to the viewer.

In yet another aspect, the present invention relates to a method for displaying musical data on a display having an image plane. A display having an image plane is provided. A time axis associated with musical data is represented as a spatial path through a three-dimensional space. Graphical symbols associated with the musical data are plotted along the spatial axis and the graphical symbols are rendered onto the image plane of the display. In some embodiments, the musical data for display is retrieved from a memory element. In some embodiments that spatial path is linear, curved, continuous, or discontinuous. Musical data may be displayed on graphical surfaces aligned with the spatial path. The graphical surfaces form, in some embodiments, a tunnel through which the time axis associated with the musical data runs. In other embodiments, the graphical surfaces form a road along which the time axis associated with the musical data runs. The graphical symbols representing the musical data may be manipulated to provide the viewer with the appearance of motion along the time axis associated with the musical data. Alternatively, a camera representing the user's position in the three-dimensional environment may be moved to provide the user with the appearance of motion.

BRIEF DESCRIPTION OF THE DRAWINGS

The invention is pointed out with particularity in the appended claims. The advantages of the invention described above, together with further advantages, may be better understood by referring to the following description taken in conjunction with the accompanying drawings. In the drawings, like reference characters generally refer to the same parts throughout the different views. Also, the drawings are not necessarily to scale, emphasis instead generally being placed upon illustrating the principles of the invention.

DETAILED DESCRIPTION OF THE INVENTION

When the following specification refers to displaying musical data in a three-dimensional environment, it should be understood that it refers to the illusion of a three-dimensional "virtual" space displayed on a two-dimensional display screen. This effect is achieved by mathematically "rendering" two-dimensional images from objects in a three-dimensional "virtual space" using a "virtual camera," just as a physical camera optically renders a two-dimensional view of real three-dimensional objects. Animation may be achieved by displaying a series of two-dimensional views in rapid succession, similar to motion picture films that display multiple still photographs per second.

Each object in a three-dimensional space is typically modeled as one or more polygons, each of which has associated visual features such as texture, transparency, lighting, shading, anti-aliasing, z-buffering, and many other graphical attributes. The combination of all the polygons with their associated visual features can be used to model a three-dimensional scene. A virtual camera may be positioned and oriented anywhere within the scene. In many cases, the camera is under the control of the viewer, allowing the viewer to scan objects. Movement of the camera through the three-dimensional space results in the creation of animations that give the appearance of navigation by the user through the three-dimensional environment.

Figure 1A:
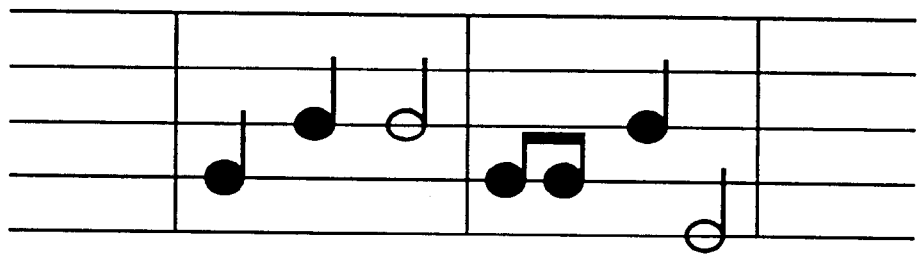
FIGS. 1A–1B depict musical data represented in common practice notation and piano roll notation, respectively.
Figure 1B:
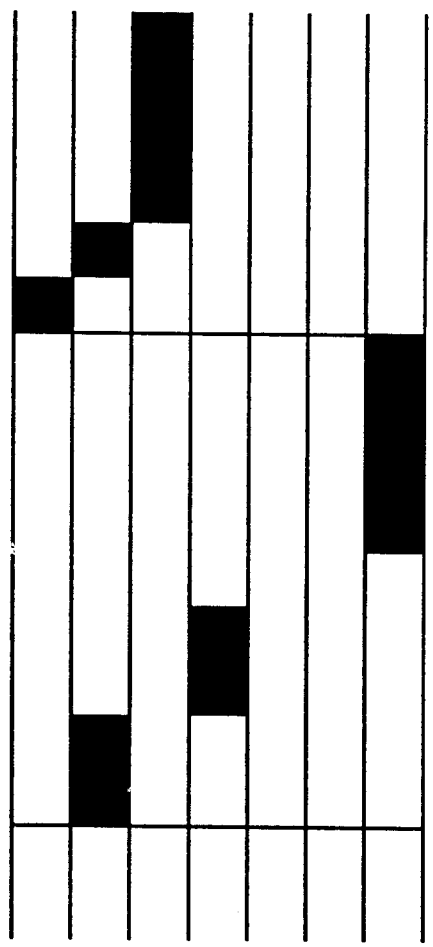
Figure 2:
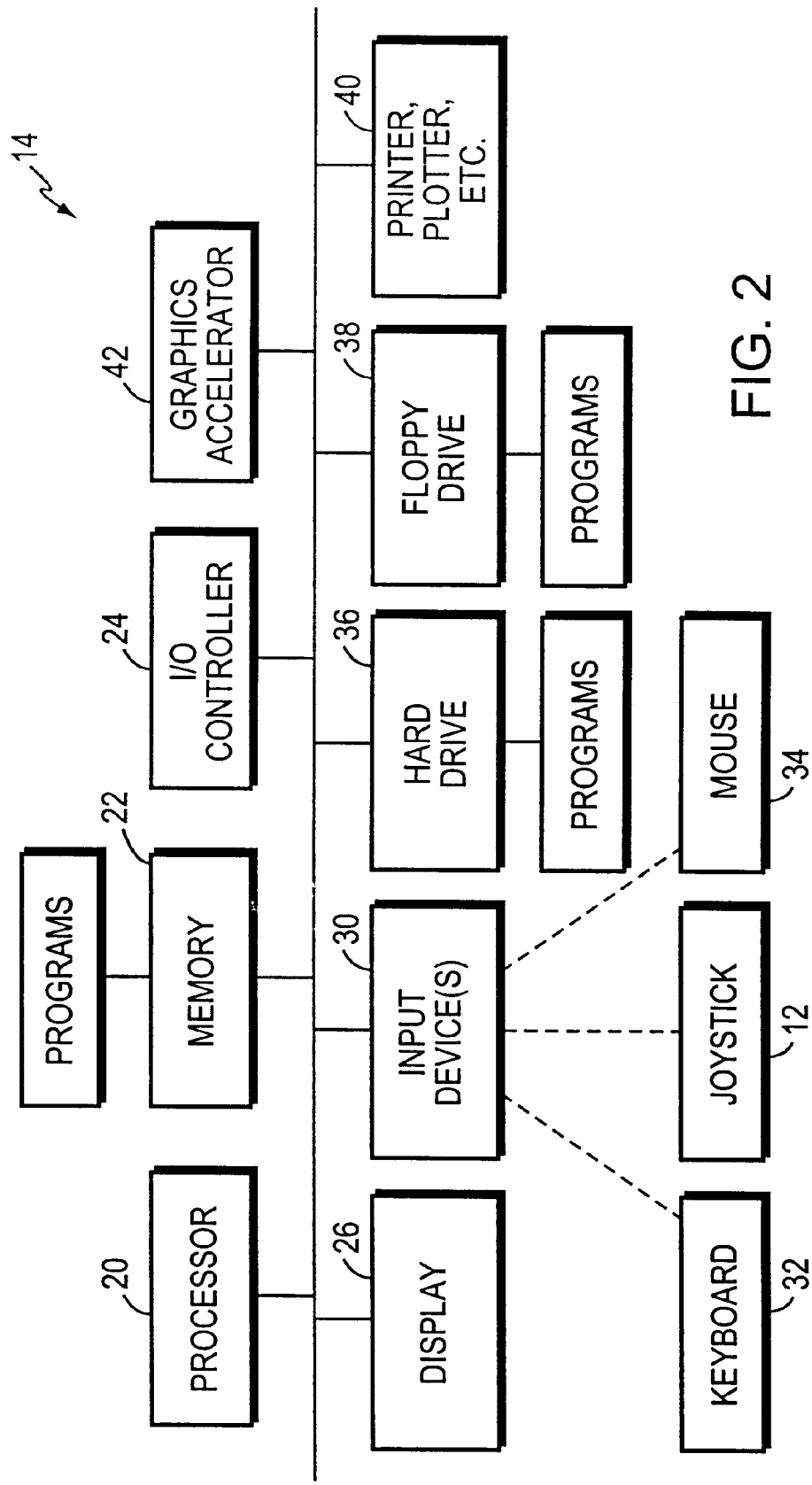
FIG. 2 is a simplified block diagram of a computer system in which the present invention can be embodied.

Referring now to FIG. 2, a simplified block diagram of a computer system 14 is shown. A computer system 14 typically will include a central processor 20, a main memory unit 22 for storing programs or data, an input/output (I/O) controller 24, a display device 26, and a data bus 28 coupling these components to allow communication between them. The display device 26 has an image plane that displays images to a viewer. For example, the image plane of a display is the screen of the monitor. The memory 22 includes random access memory (RAM) and read only memory (ROM) chips. The computer 14 typically also has one or more input devices 30 such as a keyboard 32, a mouse 34, or a joystick 12. Other input devices that may be present are mouse pointing devices, tracballs, sliders, faders, game pads or infrared transceivers.

The computer 14 typically also has a hard drive 36 and a floppy drive 38 for receiving floppy disks such as 3.5 inch disks. Other devices 40 also can be part of the computer 14 including output devices (e.g., printer or plotter) and/or optical disk drives for receiving and reading digital data on a CD-ROM. These programs can be loaded onto the hard drive 36 and/or into the memory 22 of the computer 14 via the floppy drive 38. In general, the controlling software program(s) and all of the data utilized by the program(s) are stored on one or more of the computer's storage mediums such as the hard drive 36, CD-ROM 40, etc. In general, the programs implement the invention on the computer 14, and the programs either contain or access the data needed to implement all of the functionality of the invention on the computer 14.

Alternatively, a software graphics engine may be provided which supports three-dimensional scene creation and manipulation. A graphics engine generally includes one or more software modules that perform the mathematical operations necessary to "render" the three-dimensional environment, which means that the graphics engine applies texture, transparency, and other attributes to the polygons that make up a scene. Graphic engines that may be used in connection with the present invention include Realimation, manufactured by Realimation Ltd. of the United Kingdom and the Unreal Engine, manufactured by Epic Games. Although a graphics engine may be executed using solely the elements of a computer system recited above, in many embodiments a graphics hardware accelerator 42 is provided to improve performance. In the embodiment shown in FIG. 2, the graphics accelerator 42 communicates with the central processor 20 over the system bus. In some embodiments, the graphics accelerator 42 communicates directly with the central processor 20 using a processor port. Generally, a graphics accelerator 42 includes video memory that is used to store image and environment data while it is being manipulated by the accelerator 42.

Graphics accelerators suitable for use in connection with the present invention include: the VOODOO 3 line of graphics boards manufactured by 3dfx Interactive, Inc. of San Jose, Calif.; the RAGE line of graphics boards, manufactured by ATI Technologies, Inc. of Thornhill, Ontario, Canada; the VIPER, STEALTH, and SPEEDSTAR lines of graphics boards manufactured by S3, Inc. of Santa Clara, Calif.; the MILLENIUM line of graphics boards manufactured by Matrox Electronic Systems, Ltd. of Dorval, Quebec, Canada; and the TNT, TNT2, RIVA, VANTA, and GEFORCE256 lines of graphics boards manufactured by NVIDIA Corporation, of Santa Clara, Calif.

The special abilities of the graphics system are made available to programs via an application programming interface (API). DIRECT3D, a standard API manufactured by Microsoft Corporation of Redmond, Wash. may be used and provides some level of hardware independence. The API allows a program to specify the location, arrangement, alignment, and visual features of polygons that make up a three-dimensional scene. The API also allows the parameters associated with a virtual camera to be controlled and changed.

Although various apparatus have been discussed in connection with general-purpose computers, it is well understood by those of ordinary skill in the art that special-purpose hardware performing the same function may also be used.

Figure 3:
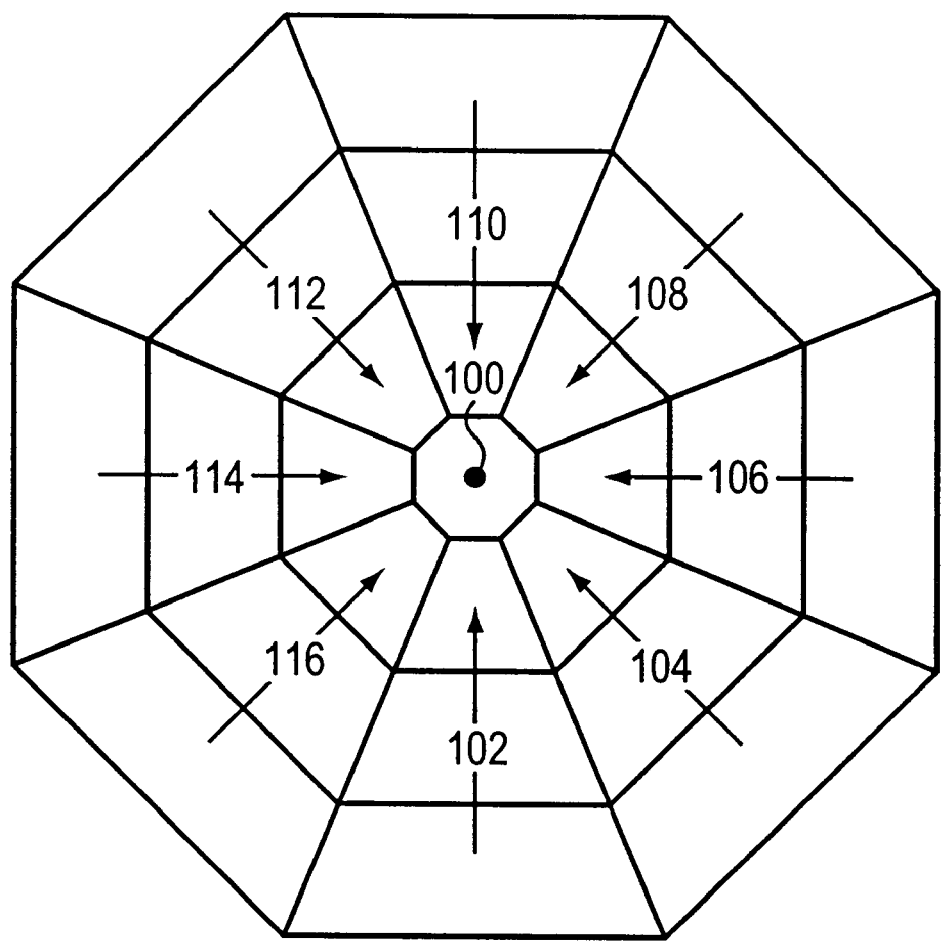
FIG. 3 is a perspective view of an embodiment of a three-dimensional space for displaying musical data.

Referring now to FIG. 3, an embodiment of a three-dimensional "tunnel" for displaying music is shown. In the embodiment shown in FIG. 3, the spatial path corresponding to the time axis 100 associated with music to be displayed extends directly forward from the image plane. Each of the sides 102, 104, 106, 108, 110, 112, 114, 116 form a surface along which graphical symbols corresponding to musical data may be displayed. This data may include information about timbre, pitch, volume, duration, articulation, and any other time-varying aspects of the musical composition being displayed. The graphics engine may access memory element 22 to retrieve data for display. The memory element 22 accessed by the graphics engine may be supplied with musical data from a MIDI file stored on hard drive 36. In other embodiments, the memory element 22 is supplied with musical data directly from an instrument such as a guitar or keyboard. In other embodiments the graphics engine is supplied with data received from a network or generated by a music generation engine, such as those described in commonly-owned U.S. Pat. Nos. 5,627,335 and 5,763,804, the contents of which are incorporated herein by reference.

Although an octagonal tunnel is depicted in FIG. 3, the three-dimensional tunnel may have any number of sides. In some particular embodiments, the number of sides to be used may be based on the number of viewers of the display. In still other embodiments, the number of sides is based on the number of tracks of musical information to be displayed. For example, a square-shaped three-dimensional tunnel would be sufficient to display four tracks of musical information if a single track is assigned to each surface.

In still other embodiments, the sides do not form a closed shape. The sides may form a road, trough, or some other complex shape that does not have its ends connected to form a closed shape.

Figure 3A:
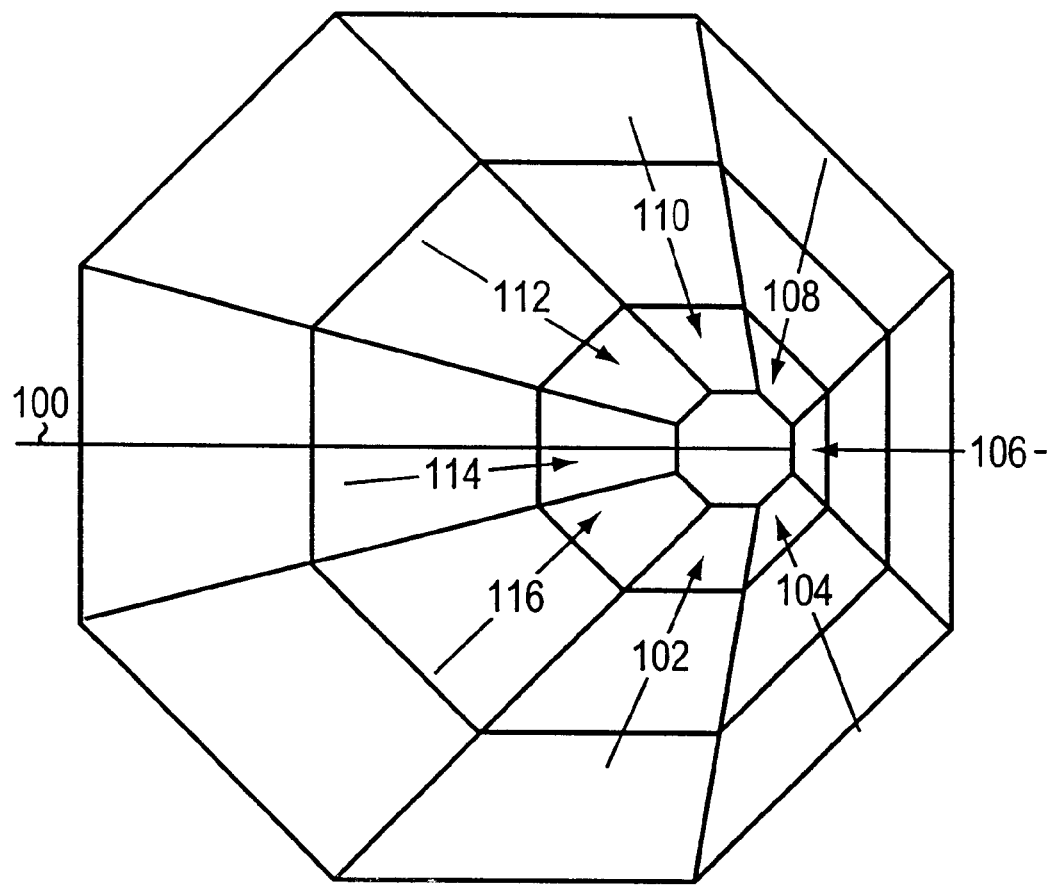
FIG. 3A is a perspective view of a three-dimensional space for displaying musical data in which the time axis associated with the musical data extends obliquely from the image plane associated with the display.

In other embodiments, the spatial path corresponding to the musical time axis does not extend perpendicularly from the image plane of the display. FIG. 3A depicts an embodiment of a three dimensional space in which the time axis 100 associated with the music data extends obliquely from the image plane of the display. In further embodiments, the tunnel may be curved or may be some combination of curved portions and straight portions. In still further embodiments, the tunnel may form a closed loop through which the viewer may travel, such as a circular or ellipsoid loop.

As depicted in FIGS. 3 and 3A, each surface may be subdivided into a plurality of segments. Each segment may correspond to some unit of musical time, such as a beat, a plurality of beats, a measure, or a plurality of measures. Although the embodiments shown in FIGS. 3 and 3A show equally-sized segments, each segment may have a different length depending on the particular musical data to be displayed. In addition to musical data, each segment may be textured or colored to enhance the interactivity of the display.

In some embodiments a cursor is provided to indicate which surface is "active," that is, with which surface a viewer can be considered to be musically interacting. In these embodiments, the viewer can use an input device 30 to move the cursor from one surface to another. In further embodiments, the display is used for a multi-player game. In these embodiments, a surface may be colored or textured to identify which user has created the musical data corresponding to the graphical symbols plotted upon that surface.

Figure 4A:
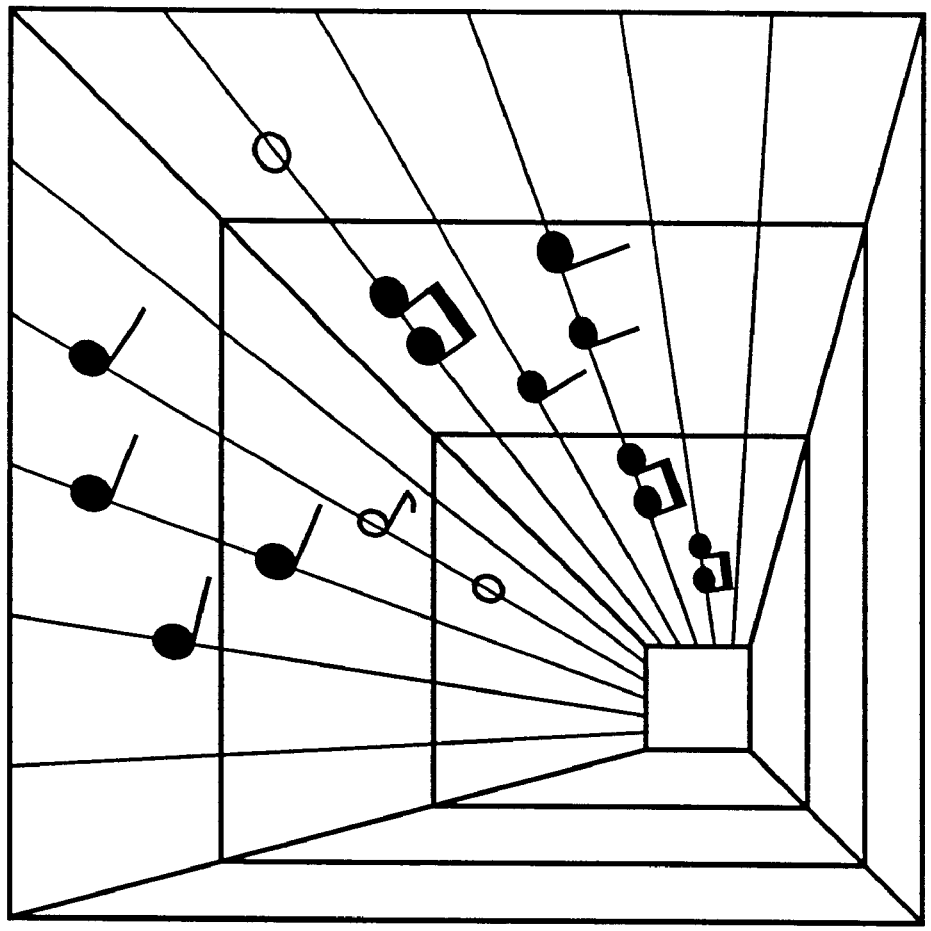
FIG. 4A is a perspective view of a three-dimensional space displaying musical data in common practice notation.
Figure 4B:
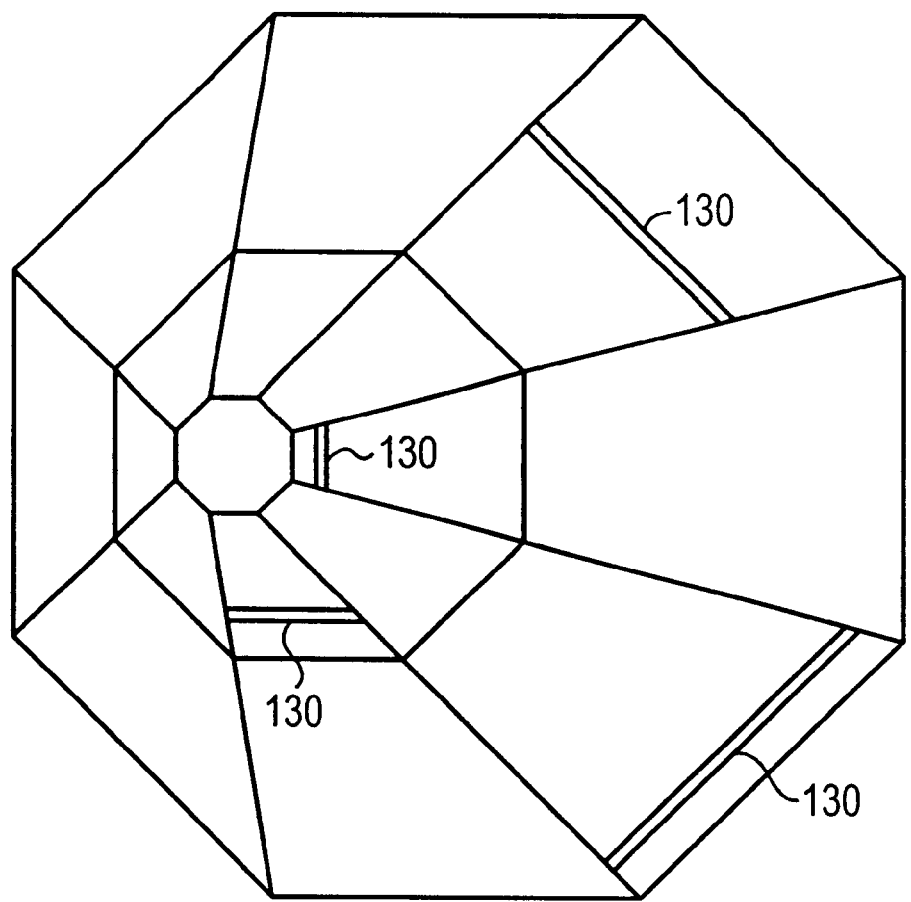
FIG. 4B is a perspective view of a three-dimensional space displaying musical data as a plurality of bars.

FIG. 4A depicts a three-dimensional tunnel displaying musical data in common practice notation on two surfaces of the three-dimensional tunnel. Although FIG. 4A depicts musical data in common practice notation, musical data may be displayed in number of formats. In FIG. 4B musical data is represented by graphical bars 130. Each of the bars displayed in the three dimensional tunnel may indicate a musical event such as the start of a note or a series of notes.

As can be seen from the foregoing figures, the appearance of movement through the three-dimensional space may be simulated by moving the camera along the time axis 100 of the graphical display using the API of the graphics engine. Each API associated with the graphics engines referred to above allow various parameters of the virtual camera to be controlled, including position, orientation, and focal length. Thus, in order to provide the user with the appearance of movement through a three-dimensional environment, the graphics engine is instructed to move the virtual camera through the environment.

In one embodiment, the position of the viewer in the three-dimensional space, and thus the temporal location of the user in the musical score, may be signified by a graphical element. Alternatively, the viewer's position may be signified by graphically altering the graphical symbols representing the musical data. For example, the graphical symbols may flash as the viewer passes by or over them, or they may change color or be highlighted.

As the viewer moves through the three-dimensional space along the spatial path associated with the musical timeline, the musical data represented by associated graphical symbols is substantially simultaneously played as audile music. Thus, in some embodiments, a viewer observes both visual musical output and aural musical output synchronously.

Figure 5:
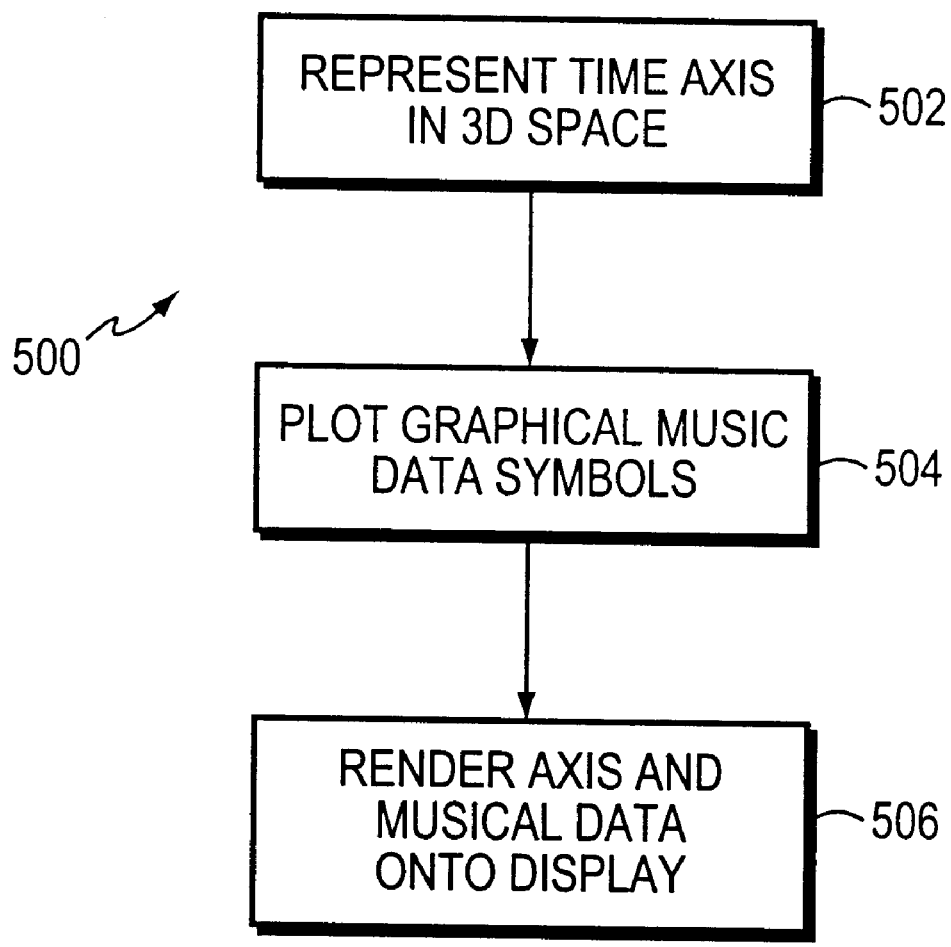
FIG. 5 is a flowchart showing the steps to be taken to represent musical data in a three-dimensional space.

Referring now to FIG. 5, a flowchart showing the steps to be taken to display musical data on a display are shown. In brief overview, the method includes the steps of representing a time axis associated with the musical data as a path through a three-dimensional space (step 502), plotting graphical symbols associated with the musical data along the spatial path (step 504) and rendering the three-dimensional space for display (step 506).

In some embodiments, a display is provided (step not shown). The provided display is any display that supports the drawing of multiple image frames per second, such as a cathode ray tube, liquid crystal display, plasma display or light-emitting diode display. In preferred embodiments, the display supports frame rates of greater than 24 frames per second in order to render movement along the time axis in a fluid fashion.

A time axis associated with musical data is represented as a path through three-dimensional space (step 502). The musical data may be stored in a memory element or it may be received from a network connection or associated input device.

Graphical symbols associated with the musical data are plotted along the spatial path (step 504). For example, in one embodiment the graphical elements are note as used in common practice notation. In other embodiments, the graphical elements are rectangles representing piano roll notation. In still other embodiments the graphical elements are geometric shapes that signal musical events. In still further embodiments related to multi-user games, the graphical elements may be alphanumeric or may indicate the identity of the "owner" of that element.

The musical data is rendered as a two-dimensional view of a three-dimensional environment defined by the stored musical data and the spatial path (step 506). A graphics engine may be used to render the data in response to API commands issued to it by an application program, as described above. In some alternative embodiments, the output may be directed to a network port or to a printer 40.

In some embodiments, no rendering process is used. Instead a three-dimensional environment is simulated using two-dimensional graphical shapes selected and arranged to create the illusion of depth. This technique of simulating three dimensions with two-dimensional graphics is sometimes referred to as "2.5D". It should be understood that 2.5D technique may be used in the present invention as well as true three-dimensional rendering. The present invention may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, for example, LISP, PERL, C, C++, or PROLOG. The software programs may be stored on or in one or more articles of manufacture as object code.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for displaying musical data having a musical time axis on a display having an image plane, the method comprising the steps of:
   (a) representing the musical time axis as a spatial path that does not lie within an image plane of a display; and
   (b) rendering the spatial path into the image plane.

2. The method of claim 1 further comprising the step of providing a display having an image plane.

3. The method of claim 1 wherein step (a) comprises a spatial path that is continuous.

4. The method of claim 1 wherein step (a) comprises a spatial path that is discontinuous.

5. The method of claim 1 wherein step (a) comprises a spatial path that is linear.

6. The method of claim 1 wherein step (a) comprises a spatial path that is non-linear.

7. The method of claim 1 further comprising the step of displaying graphical symbols corresponding to musical data along the spatial path corresponding to the musical time axis.

8. The method of claim 7 further comprising the step of manipulating the spatial positions of the graphical symbols associated with musical data to achieve the appearance of motion along the spatial path.

9. The method of claim 1 further comprising the step of displaying graphical symbols corresponding to musical data along graphical surfaces aligned with the spatial path.

10. The method of claim 9 wherein the graphical surfaces aligned with the spatial path form a tunnel.

11. The method of claim 1 further comprising the step of changing the position of a virtual camera to achieve the appearance of motion substantially along the spatial path.

12. The method of claim 1 further comprising the step of retrieving musical data for display from a memory element.

13. The method of claim 1 further comprising the step of visually representing the position of the viewer along the musical time axis.

14. The method of claim 13 further comprising the step of aurally outputting musical data associated with the visual position of the viewer.

15. An apparatus for displaying musical data comprising:
    a memory element storing musical data; and
    a graphics engine, in communication with said memory element, rendering the musical data such that a spatial path corresponding to a musical time axis associated with the musical data does not lie in an image plane of a display.

16. The apparatus of claim 15 further comprising a display having an image plane.

17. The apparatus of claim 15 wherein the spatial path is non-linear.

18. The apparatus of claim 15 wherein the spatial path is discontinuous.

19. The apparatus of claim 15 wherein said graphics engine changes the position of a virtual camera to provide the appearance of motion along the spatial path.

20. The apparatus of claim 15 further comprising an audio output device.

21. A method for displaying musical data on a display having an image plane, the method comprising the steps of:
    (a) providing a display having an image plane;
    (b) representing a time axis associated with musical data as a path through a three-dimensional space;
    (c) plotting graphical symbols associated with the musical data along the spatial path; and
    (d) rendering the time axis and plotted symbols onto the image plane of the provided display.

22. The method of claim 21 further comprising the step of retrieving musical data for display from a memory element.

* * * * *